T. H. SHERMAN.
GUN CAMERA.
APPLICATION FILED FEB. 12, 1914.
1,118,066.
Patented Nov. 24, 1914.
2 SHEETS—SHEET 2.
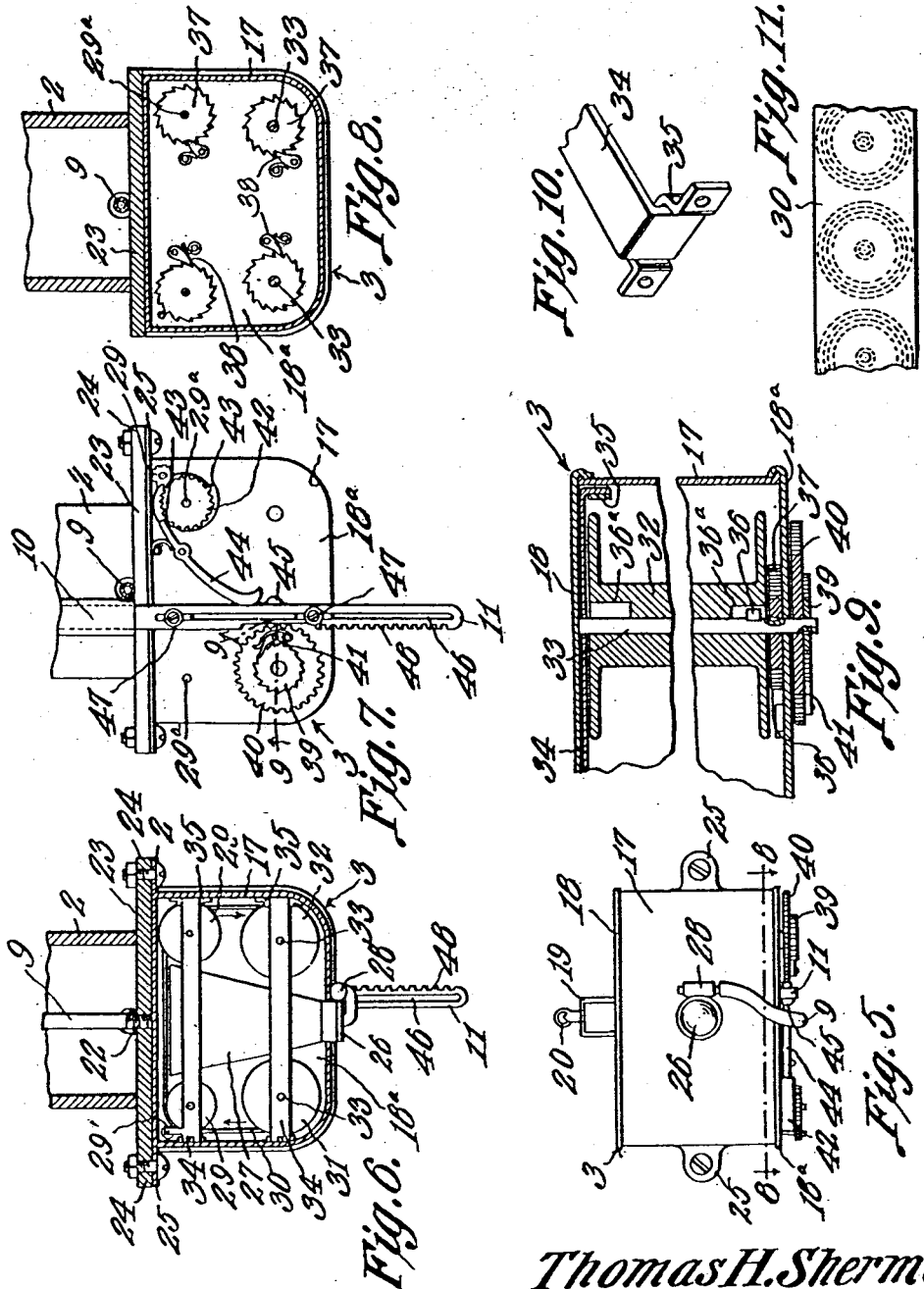
Witnesses
Thomas H. Sherman,
Inventor
by C. A. Snow & Co.,
Attorneys

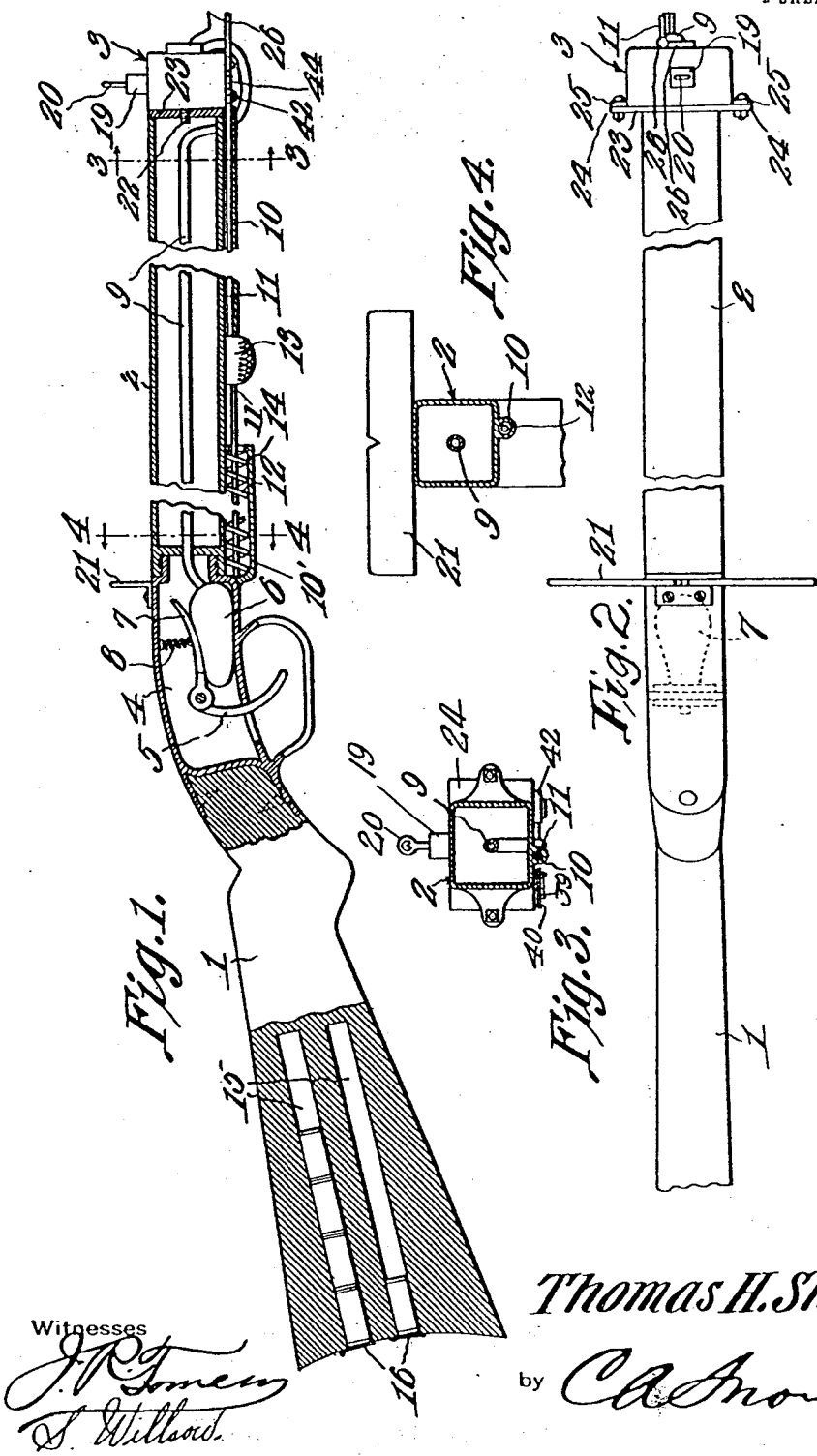

UNITED STATES PATENT OFFICE.

THOMAS HENRY SHERMAN, OF TRAVERSE CITY, MICHIGAN.

GUN-CAMERA.

1,118,066.   Specification of Letters Patent.   Patented Nov. 24, 1914.

Application filed February 12, 1914. Serial No. 818,407.

*To all whom it may concern:*

Be it known that I, THOMAS HENRY SHERMAN, a citizen of the United States, residing at Traverse City, in the county of Grand Traverse and State of Michigan, have invented a new and useful Gun-Camera, of which the following is a specification.

The present invention appertains to a gun camera, and aims to provide a novel and improved contrivance of that character.

It is the object of the present invention to provide a photographic device, in the form of a gun carrying a camera, whereby the device may be readily manipulated for taking snap shots of birds in motion, or other moving objects, as well as birds, animals, and other objects, at rest.

It is the object of the present invention to provide a gun camera which may be employed by boys or children as a toy gun, and which may be employed by sportsmen, hunters, and other gunners, for the purpose of practice in trap or wing shooting, or for "shooting" at targets or other stationary objects.

As a more specific object, the present invention aims to provide a gun, carrying a camera at the muzzle end of the barrel, the camera being arranged to hold a film, and means being provided for operating the lens shutter of the camera, and for feeding the film after each exposure, whereby the gun camera will be of the repeater type.

With the foregoing general objects outlined, and with other objects in view, which will be apparent as the nature of the invention is better understood, the present invention resides in the combination and arrangement of parts and in the details of construction hereinafter described and claimed, it being understood that changes in the precise embodiment of the invention herein disclosed can be made within the scope of what is claimed without departing from the spirit of the invention.

The invention has been illustrated in one of its preferred embodiments in the accompanying drawings, wherein:—

Figure 1 is a longitudinal section of the device, portions being broken away, and portions being shown in full. Fig. 2 is a plan view of the device, portions being broken away. Figs. 3 and 4 are cross sections of the gun barrel, taken on the lines 3—3 and 4—4 respectively of Fig. 1. Fig. 5 is an enlarged front view of the camera. Fig. 6 is a sectional view of the camera as attached to the muzzle end of the gun barrel. Fig. 7 is a bottom view of the camera. Fig. 8 is a sectional detail taken on the line 8—8 of Fig. 5. Fig. 9 is an enlarged sectional detail taken on the line 9—9 of Fig. 7. Fig. 10 is a perspective detail of the free end of one of the hinged straps for holding the film reels or spools and the guide rollers, and illustrating the same as engaged to the keeper. Fig. 11 is a fragmental view in detail of the film.

In carrying out the present invention, there is provided a gun of simple and inexpensive construction, embodying the wooden stock 1, and the sheet metal barrel 2, which has its breech end in threaded engagement with the stock, whereby the gun may be separated for compact carriage or handling.

The camera, which is designated generally by the numeral 3, is carried by the muzzle end of the gun barrel 2, and will be described in detail hereinafter.

The stock 1 is provided at the breech end of the barrel with a chamber or recess 4 in which is pivoted a trigger 5, and a bulb 6 is disposed within the chamber 4 below the presser 7 carried by the trigger 5 within the said chamber. The presser 7 is connected by means of a retractile spring 8 to the top of the chamber 4 for returning the trigger and its presser to normal or inoperative position. To the bulb 6 is attached the tubing 9 which extends through the gun barrel 2 for connection with the camera as will hereinafter appear.

A longitudinal guide tube 10 is secured to the bottom of the muzzle end of the barrel 2, and a reciprocatory rod 11 is slidable within the tube 10, a second tube 10' being secured to the bottom of the breech end of the barrel and receiving the inner end of the rod 11, and the rod 11 having a handle or hand hold 13 working within the opening between the tubes 10 and 10' and normally resting against the rear end of the guide tube 10. A coiled wire compression spring 12 is disposed within the tube 10', the rod 11 having a pin or collar 14 within the tube 10' against which the spring seats, to yieldably advance the rod 11. The rod 11 is arranged to actuate the film, as will hereinafter more fully appear.

The stock 1 is provided with a pair of bores, 15, normally closed by pivoted closures or caps 16, whereby one of the bores may be employed as a magazine for holding a plurality of unexposed rolls of films, while the other bore may be employed for holding the exposed rolls or films, as will be evident.

Returning to the construction of the camera 3 *per se*, the same embodies a suitable case 17 having the removable top 18, which is preferably arranged to snap into engagement with the walls of the case 17, similar to a watch cover with a watch case. It will be apparent, however, that the cover or top of the case 17 may be rendered removable in various manners. The bottom 18ª of the case is also preferably rendered removable, should it be desired or necessary.

The top or cover 18 of the camera case carries a suitable finder 19, and the fore bead sight 20 is mounted upon the finder 19, while the rear sight 21 is carried by the stock 1. The rear sight is preferably elongated transversely, so as to project to both sides of the gun, and is provided with a central notch in its upper edge. The rear sight 21 permits the gun to be readily leveled with a bird in flight, or other moving object, to thereby facilitate the proper positioning of the camera.

In attaching the camera case 17 to the muzzle end of the gun, the back of the case 17 is provided with a stem 22 engaging through a central aperture provided in the plate 23 secured to the muzzle end of the gun barrel 2, the plate 23 being provided with side ears 24 to which are bolted or otherwise secured the ears 25 projecting from the back of the case 17, at the sides thereof. In this manner, the camera is readily attached to the muzzle of the gun, and may be readily removed or detached when desired.

The front wall of the case 17 is provided with a suitable rapid lens 26 embodying a sensitive or quick-acting shutter, and a blackened cone 27 extends between the lens and shutter 26 to the back wall of the case 17, the apex of the cone 27 being attached to the front wall of the case, while the large end thereof, is preferably attached to the bottom of the case to be supported thereby. The shutter actuator 28 has connected thereto, the forward end of the tube 9, which is passed downwardly through the muzzle end of the barrel 2 and below the camera case 17. It will be evident at this point, that when the trigger 5 is actuated, the bulb 6 will be compressed by the presser 7, to thereby actuate the lens shutter, the bulb 6 opening or returning to normal position, after the trigger is released.

A pair of guide rollers 29 are mounted within the case 17 at the corners between the sides and back of the case, and having the lower ends of their spindles or shafts 29ª journaled or trunnioned to the bottom of the case, and the sensitized film 30 passes over the rollers 29, in back of the cone 27 along the back of the case 17, or between the back of the case and the cone 27. The film 30 is normally wound upon the reel or spool 31 disposed at one side of the cone 27, and is arranged to be wound upon a reel or spool 32 at the other side of the cone, similar to the prevailing types of film cameras now in use. The reels or spools 31 and 32 are mounted upon spindles 33 journaled through the bottom of the case adjoining the sides thereof, and a pair of straps 34 are hinged to one side of the case 17, and have their free ends arranged to be engaged by keepers or sockets 35 attached to the other side of the case, the straps or bars 34 having apertures for receiving the upper ends of the spindles 29ª and 33, respectively. Thus, when the straps or bars 34 are swung into place, they will maintain the reels or spools 31 and 32 in position upon the spindles 33, and will also maintain the guide rollers in place, and when the straps or strips 34 are raised or swung upwardly, they will release the reels, whereby the reel 32 containing the exposed film may be withdrawn, to be replaced by the emptied spool 31, and whereby another roll of film may be substituted for the removed reel or spool 31. The rollers 29 being released by the respective strap 34, will permit the film to be readily trained over the said rollers and behind the cone 27, in order that the free end of the film may be attached to the empty spool or reel, as shown in Fig. 6. Ordinarily, when the top or cover of the case is in place, the same will lock the straps or strips 34 in position, so that when the top or cover is removed, the straps 34 may be swung out of engagement with the rollers 29 and spindles 33, respectively. The spindles 33 are each provided with a key 36 adjoining the bottom of the case 17, while the reels or spools 31 and 32 are provided with key seats or notches 36ª to engage over the keys 36, whereby the reels or spools will be constrained to rotate with the spindles, the reels or spools being reversible so that they may be applied from one spindle to the other, as is understood in the art.

In order to prevent the retrograde movement of the spindles 29ª and 33, ratchet wheels 37 are secured or keyed upon the said spindles adjoining the bottom of the case, and spring pressed dogs or pawls 38 are carried by the bottom of the case and coöperate with the said ratchet wheels, whereby the spindles may rotate in one direction, for feeding the film, as will hereinafter appear, and will be locked against retrograde or reverse movement.

As a means for actuating and controlling the movement of the spindle 33 having the reel or spool 32 thereon, a ratchet wheel 39 is keyed upon the lower end portion of the said spindle 33 below the bottom of the case 17, and a gear wheel or pinion 40 is mounted loosely on the said spindle between the ratchet wheel 39 and the bottom of the case, a spring pressed pawl or dog 41 being carried by the bottom of the pinion to yieldably engage the ratchet wheel 39 for permitting the pinion to drive the ratchet wheel, as will hereinafter appear.

To the lower extremity of one spindle 29ª, preferably at that side of the case opposite to the ratchet wheel 39 and pinion 40, is keyed or secured an escapement wheel or disk 42; having diametrically opposite shoulders 43, coöperating with a spring pressed pawl or dog 44 pivoted to the bottom of the case 17, the detent, pawl or dog 44 being spring pressed to normally engage one or the other of the shoulders 43, to prevent the reverse rotation of the roller 29, whereby the film will be prevented from ordinarily unrolling from the spool or reel 31. The dog or pawl 44 has its free end coöperating with a cam 45 formed upon one side of the actuating rod 11 which rod projects under and beyond the bottom of the camera. Ordinarily, when the rod 11 is advanced or in its normal position, the cam 45 will stand in advance of or adjoining the free end of the pawl or dog 44, whereby, when the rod is drawn rearwardly, the pawl or dog 44 will be released from the respective shoulder 43 of the escapement wheel 42. The forward end portion of the rod 11 is provided with a rack 48 at the side opposite that side having the cam 45, the rack 48 being normally slightly in advance of the gear or pinion 40, and being adapted to intermesh with the said gear or pinion when the rod is drawn rearwardly or inwardly. The forward end portion of the rod 11 is also provided with a longitudinal slot 46 through which screws or other fastening devices 47 are passed, so as to engage the bottom of the case 17, whereby the forward end portion of the rod 11 may be properly guided for coöperation with the pinion 40 and the pawl or dog 44.

It is preferable to provide a presser roller 29' coöperating with the roller 29 having the escapement wheel 42, the lower ends of the spindles of the said rollers being geared together as at 29" whereby the rollers will revolve in unison in opposite directions, the said rollers snugly receiving the film therebetween to prevent the film from slipping when the escapement wheel 42 is held by the detent or pawl 44.

In practice, the camera 3 is of miniature construction, and the film 30 is preferably of a length to take a number of exposures, say, twenty-five or fifty. The films are wound upon the reels or spools in the ordinary manner, and a reel or spool of film may be readily applied within the casing 17 of the camera as above intimated, and as illustrated at 31 in Fig. 6. The free end of the film may then be readily trained over the guide rollers 29 to be attached to the empty reel or spool 32. Thus, after the straps or strips are swung back to place, and the top or cover of the case 17 is again positioned, the device is in condition for use. The object which is to be photographed, may be quickly brought into the field of the camera, by aiming the gun through the medium of the sights 20 and 21 so that when the gun is properly aimed at the object, the shutter may be actuated by pulling the trigger, as above described. It is to be understood that before the film is exposed, the same is properly wound upon the empty spool 32, to bring an unexposed portion in rear of the cone 27, the cone 27 confining the light rays, and producing a circular image or picture.

After the first picture or snapshot has been taken, the film may be fed or advanced one step, by drawing the rod 11 rearwardly, through the medium of the handle or hand piece 13, whereby the cam 45 will first release the pawl or dog 44 from the escapement wheel 42, in order that the film may unroll from the reel or spool 31. Then, as the rod 11 is moved rearwardly farther, the rack 48 will engage with the pinion or gear 40 after the escapement wheel 42 has been released, in order that the film may be wound upon the reel or spool 32, the movement of the pinion 40 imparting a rotary movement to the pawl or dog 41 carried thereby and the pawl engaging the ratchet wheel 39 will rotate the respective spindle 33 and the reel or spool 32 thereon in the proper direction to wind up the film. As soon as the film commences to unwind from the reel or spool 31, the cam 45 having passed the pawl 44, the pawl or dog 44 will again engage the periphery of the escapement wheel 42, so as to be engaged by the approaching shoulder 43, when the film is unwound for one-half a turn of the respective guide roller 29, whereby the feeding or advancing of the film will be properly limited to bring a new unexposed portion in rear of the cone 27.

When the rod 11 is released, the same will be returned to normal position, by the spring 12, the pinion 40 being rotated reversely by the rack 48, and the pawl or dog 41 being carried idly around the ratchet wheel 39 by the pinion. The pawls or dogs 38 carried by the bottom of the case 17 engaging the ratchet wheels 37 will prevent the spindles 29ª and 33 from rotating in a retrograde or reverse direction, which would permit the film to unwind, as would be objectionable. It will thus be evident that the film will be held taut between the guide rollers 29, in order to be properly held in focus with the lens. When the rod 11 is moved forwardly under the influence of the spring 12, the cam 45 will snap past the pawl 44, without interfering with the escapement wheel 42.

In the manner indicated, the operation of the device may be repeated rapidly, the stock 1 being held steady against the shoulder, in order that the trigger 5 may be operated by the forefinger of the right hand, while the film-actuating rod 11 may be manipulated by the left hand. After the successive exposures of the film have been made, the film may be completely wound upon the spool 32, the said spool may then be removed and placed in the proper bore or receptacle of the stock, and a new roll or spool may be removed from the magazine of the stock 1, and then placed in the camera, as will be apparent without further description.

The present contrivance is adapted for numerous uses. The device may be employed as a toy by boys or children, for "shooting" each other, or for "shooting" birds, animals, and other moving or stationary objects, the present device providing a harmless, amusing and instructive substitute for ordinary air rifles or fire arms. When the films are developed, and positives or prints made, the "hits" may be determined by the proximity of the objects photographed, to the center of the positives or pictures, which will render the developing of the pictures or positives interesting. If desired, lantern slides may be developed from the negatives, to be thrown upon a screen by a magic lantern or stereopticon, to the amusement of the observers, and by placing a hair line target in connection with the lantern slide, or upon the film as seen in Fig. 11, the object photographed will be shown upon the screen with the target, to clearly indicate the proximity of the object photographed with the center or bull's eye of the target. The present device may also be employed by sportsmen, hunters, and gunners, as a practice gun, for "sharp shooting," to thus develop the skill of the user as a wing shot, without the annoyance, expense, and danger incident to the ordinary fire arm. The present device may also be employed in sham battles and army maneuvers to advantage, the "hits" of the opposing sides being determined after the negatives are developed.

The many other capabilities of the present contrivance will be obvious to the user, and need not be itemized at length, it being noted that the present device provides a desirable one of the character set forth, for the several uses to which it may be adapted.

Having thus described the invention, what is claimed as new is:—

1. A device of the character described embodying a stock and barrel, a camera carried by the muzzle end of the barrel and including film holding and controlling means and shutter operating means, the stock having a chamber at the breech end of the barrel, a bulb disposed in said chamber, a tube connecting the bulb and shutter operating means, a trigger pivoted within the said chamber, and having a presser coöperating with the bulb, and actuating means carried by the gun and operatively connected to the film controlling means.

2. In a device of the character described, a camera including a pair of holding means for film reels, detent means for normally preventing the film from feeding, actuating means coöperating with one reel holding means, and actuating means coöperating with the aforesaid detent and actuating means for successively releasing the film and operating the respective reel holding means.

3. In a device of the character described, a camera, reel holding and guide spindles carried by the camera, detent means operating with one spindle, actuating means coöperating with the detent means to release the same from the said spindle, and coöperating means carried by the actuating means and one of the reel holding spindles for actuating the last mentioned spindle after the first mentioned spindle is released.

4. In a device of the character described, a camera, reel holding and guide spindles carried by the camera, an escapement wheel carried by one guide spindle, a detent coöperating with the escapement wheel, and actuating means coöperating with the said detent and one reel holding spindle for successively releasing the detent and actuating the last mentioned spindle.

5. In a device of the character described, a camera, a pair of reel holding spindles carried by the camera, a ratchet wheel carried by one spindle, a pinion mounted loosely upon the said spindle, a pawl movable with the pinion and coöperating with the ratchet wheel, and an actuating rod having a rack coöperable with the pinion.

6. In a device of the character described, a camera carried thereby, reel holding and guide spindles carried by the camera, an escapement wheel carried by one guide spindle, a spring pressed detent coöperating with the escapement wheel, a pinion cooperating with the other spindle to actuate the same when the pinion is rotated in one direction, and an actuating rod having a cam and rack for successively coöperating with the detent and pinion, respectively, to release the detent and actuate the pinion.

In testimony that I claim the foregoing as my own, I have hereto affixed my signature in the presence of two witnesses.

THOMAS HENRY SHERMAN.

Witnesses:
CHARLES F. HUNTER,
CARL M. NORD.